(12) United States Patent
Hick et al.

(10) Patent No.: US 7,608,807 B2
(45) Date of Patent: Oct. 27, 2009

(54) CLOSED LOOP DAYLIGHT HARVESTING LIGHT CONTROL SYSTEM HAVING AUTO-CALIBRATION

(75) Inventors: Robert L. Hick, Newberg, OR (US); Richard A. Leinen, Wilsonville, OR (US)

(73) Assignee: Leviton Manufacturing Co., Inc., Melville, NY (US)

( * ) Notice: Subject to any disclaimer, the term of this patent is extended or adjusted under 35 U.S.C. 154(b) by 92 days.

(21) Appl. No.: 11/381,984

(22) Filed: May 5, 2006

(65) Prior Publication Data

US 2006/0278808 A1 Dec. 14, 2006

Related U.S. Application Data

(60) Provisional application No. 60/677,920, filed on May 5, 2005.

(51) Int. Cl.
*G01J 1/32* (2006.01)
*G01J 1/44* (2006.01)
*H05B 37/02* (2006.01)

(52) U.S. Cl. ............... 250/205; 250/214 AL; 315/156; 315/158

(58) Field of Classification Search .......... 250/205, 250/214 AL, 204, 214 D, 214 LS, 214 B, 250/214 C; 315/312, 158, 156, 307, 149, 315/150, 360, DIG. 1, DIG. 4; 362/1, 5
See application file for complete search history.

(56) References Cited

U.S. PATENT DOCUMENTS

| 4,135,116 | A | * | 1/1979 | Smith | 315/158 |
| 4,273,999 | A | * | 6/1981 | Pierpoint | 250/205 |
| 4,347,461 | A | * | 8/1982 | Carlson | 315/158 |
| 5,648,656 | A | * | 7/1997 | Begemann et al. | 250/214 AL |
| 6,388,399 | B1 | * | 5/2002 | Eckel et al. | 315/312 |

* cited by examiner

*Primary Examiner*—Georgia Y Epps
*Assistant Examiner*—Don Williams
(74) *Attorney, Agent, or Firm*—Marger Johnson & McCollom, P.C.

(57) ABSTRACT

An apparatus and method for enabling an automatic calibration sequence for a light control system having a daylight harvesting scheme is disclosed herein. An ambient light sensor connects to a detection circuit for detecting the amount of ambient light within a given zone. A microprocessor connects between the detection circuit and a dimming circuit for providing control to initiate dimming and to start the auto-calibration sequence. Responsive to the amount of ambient light detected, the dimming circuit controls the power supplied to a plurality of electrical loads. A storage unit connects to the microprocessor for storing minimum light levels assessed during the auto-calibration sequence wherein the ambient light levels are monitored for a predetermined amount of time to determine the lowest level of ambient light generated for the purpose of setting and storing a target voltage level associated with such.

21 Claims, 2 Drawing Sheets

CLOSED LOOP DAYLIGHT HARVESTING LIGHT CONTROL SYSTEM HAVING AUTO-CALIBRATION

This application claims the benefit of the filing date of a provisional application having Ser. No. 60/677,920 which was filed on May 5, 2005.

FIELD OF THE INVENTION

The present invention relates to light control switches, and, more particularly, to a daylight harvesting light control system.

BACKGROUND OF THE INVENTION

Daylight harvesting is an available lighting strategy designed to reduce excessive internal light levels during peak consumption hours, wherein external light sources, such as daylight, substitute for interior electrical lighting. For example, in an office setting, each work area must at all times be provided with a desired level of light determined based upon the tasks performed in the area or zone. Lighting, however, is generally installed by size and number sufficient to provide the minimum light level under the assumption that no other light sources are available in the interior space. Yet, during varying times of the day, other light sources may illuminate the interior space such that the level of light present is excessive. Therefore, the use of interior lighting at the same level of intensity becomes a waste of energy.

Specifically, during the day, sunlight may enter through windows and skylights. When these external light sources are present, the preset brightness of interior lighting is not necessary since these external light sources provide some or all of the minimum light level required. Daylight harvesting eliminates the excessive level of intensity of interior lighting, conserving as much as 84% of the energy required to light a facility at the minimum light level. As such, bright sunlight is enabled to provide up to 100% of illumination during midday, when energy costs are highest.

Daylight harvesting also enables a constant level of light on work surfaces to avoid moments when the external light sources provide an excessive amount of light, resulting in periods of glare. In the alternative, when light levels are low (i.e. when clouds roll in or nighttime falls), daylight harvesting maintains this constant level of light by continuously increasing and decreasing the power provided to the internal lighting. This practice enables the worker to resolve images with ease. As a result, eyestrain is avoided; and health and productivity are promoted.

Conventional technology for implementing daylight harvesting techniques incorporates the use of digital photo-sensors to detect light levels, wherein the digital photo-sensor is connected to a dimmer control circuit to automatically adjust the output level of electric lighting for promotion of a lighting balance. Dimmer control circuits, as implemented with respect to daylight harvesting, gradually increase or decrease interior lighting in response to photocell measurement of ambient light levels.

In general, dimmer control systems are widely used in indoor lighting to provide a softer feel and more controllable illumination experience as compared to on/off lighting. It is desirable to provide dimmer control systems for fluorescent as well as for incandescent lighting. Conventional dimmer control circuits include on/off switching and up/down power controls. Further, a microprocessor may be incorporated within a dimmer control circuit to provide control for various power-up, power-down and fade in/out functions. Rather than use a variable resistor type rheostat which wastes power and generates heat at low illumination levels, modern dimming control circuits employ phase regulation, in which the power circuit is switched on at a time delay following a zero-crossing of the AC sine wave input until the end of each half cycle, in an effort to supply a variable level of power to the lighting load. For dimming control in fluorescent lamps, a ballast with a controlled low voltage (0-10 V) input is desired.

When commissioning a lighting system installation that employs daylight harvesting techniques, the target voltage level for the minimum level of light or the desired steady state light level must be established for the light sensor which conventionally is a standard 0-10 volt photocell. This target voltage level is generally set manually. Accordingly, this approach requires a user to monitor the system after sunset and record the lowest value read. Thereafter, the user is required to set the desired steady state light level according to this value.

This approach, however, is not cost efficient nor convenient since it employs the use of staff or personnel after hours.

Thus, a need exists for a better calibration technique than has been described above for determining the target voltage level of a light sensor included within a light control system having a daylight harvesting feature.

SUMMARY OF THE INVENTION

To address the above-discussed deficiencies of establishing and setting the target voltage level light sensor incorporated within a light control system having daylight harvesting feature, the present invention teaches an apparatus and method for enabling a daylight harvesting control device to automatically calibrate the light sensor within the light control system by setting a target voltage level required to maintain an acceptable minimum level of light for an interior space illuminated therewith.

The light control system in accordance with the present invention includes an ambient light sensor connected to a detection circuit for detecting the amount of ambient light within a given zone. A microprocessor, having an auto-calibration subroutine, connects between the detection circuit and a dimming circuit for providing control to initiate dimming. The dimming circuit connects to electrical loads to control the power supplied these electrical loads based on the amount of ambient light detected. A storage unit connects to the microprocessor for storing the target voltage level and minimum light levels.

The automated calibration method in accordance with the present invention includes a step where all electrical loads are forced to full illumination for a defined period of time, such as a 24 hour time period. In another step, all control device inputs to each electrical load are disabled during this period of time. In yet another step, a light sensor is monitored during the period of time and the light level sensed by the light sensor is detected. At this point, each detected light level is compared with a previously stored light level to determine which light level is the lower. A target voltage level is generated based upon the lowest light level. Finally, a storage unit stores this target signal level.

In an embodiment of the light control system of the present invention, the dimming circuit may include a triac coupled to a zero crossing detector to employ phase regulation, in which the power circuit is switched ON after a time delay following a zero-crossing of the AC sine wave input until the end of each half cycle, in an effort to supply a variable level of power to the plurality of electrical loads. The dimming circuit may also be configured to provide an output in the range 0-10 V to control a ballast for use with a fluorescent lamp.

Advantages of this design include but are not limited to a closed loop daylight harvesting photocell target auto calibration method having a high performance, simple, and cost effective process.

These and other features and advantages of the present invention will be understood upon consideration of the following detailed description of the invention and the accompanying drawings.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF PREFERRED EMBODIMENTS

The present invention will now be described more fully hereinafter with reference to the accompanying drawings, in which embodiments of the invention are shown. This invention may, however, be embodied in many different forms and should not be construed as limited to the embodiments set for the herein. Rather, these embodiments are provided so that this disclosure will be thorough and complete, and will fully convey the scope of the invention to those skilled in the art.

Figure 1:
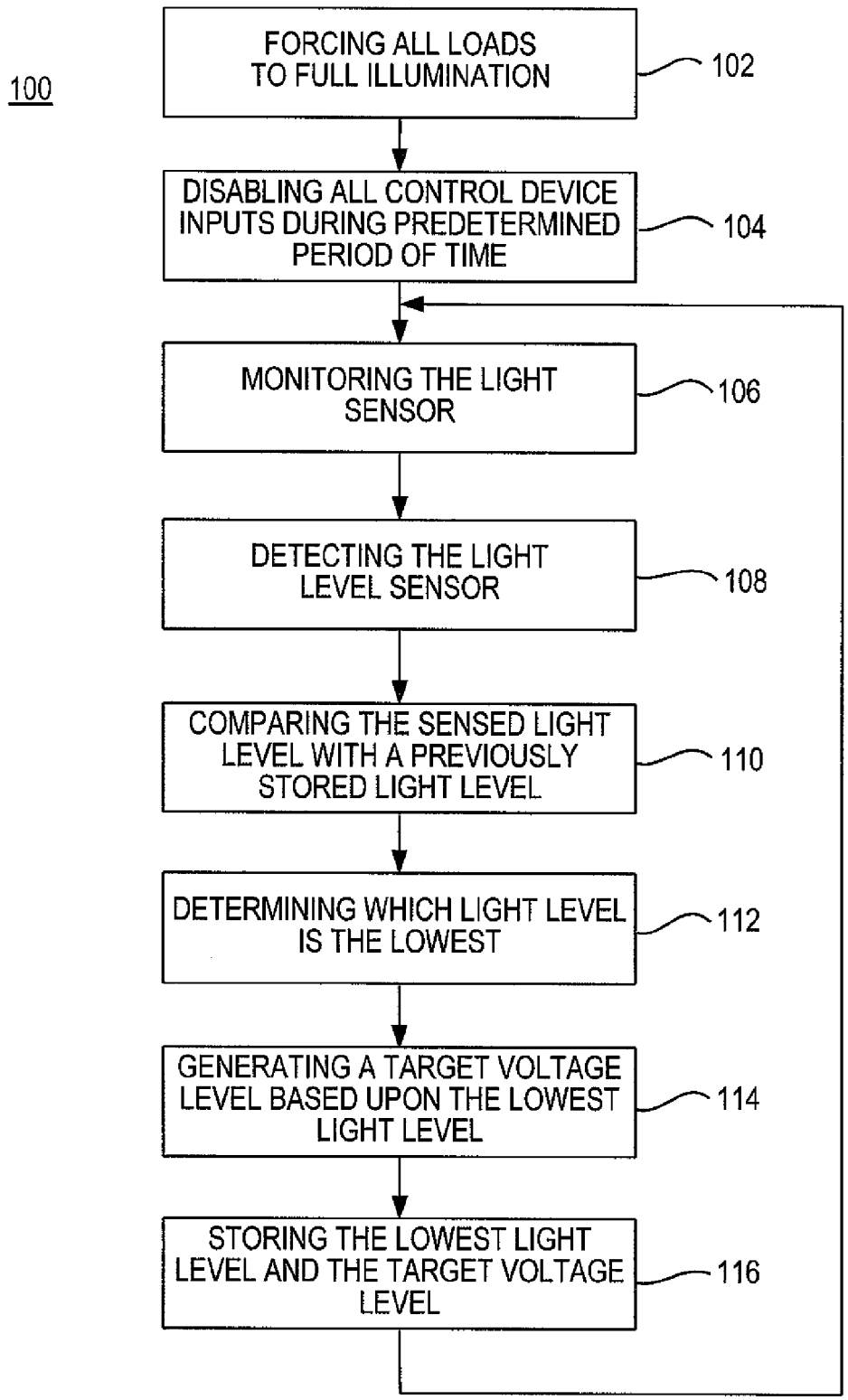
FIG. 1 shows a flow chart of the auto-calibration technique in accordance with the present invention.
Figure 2:
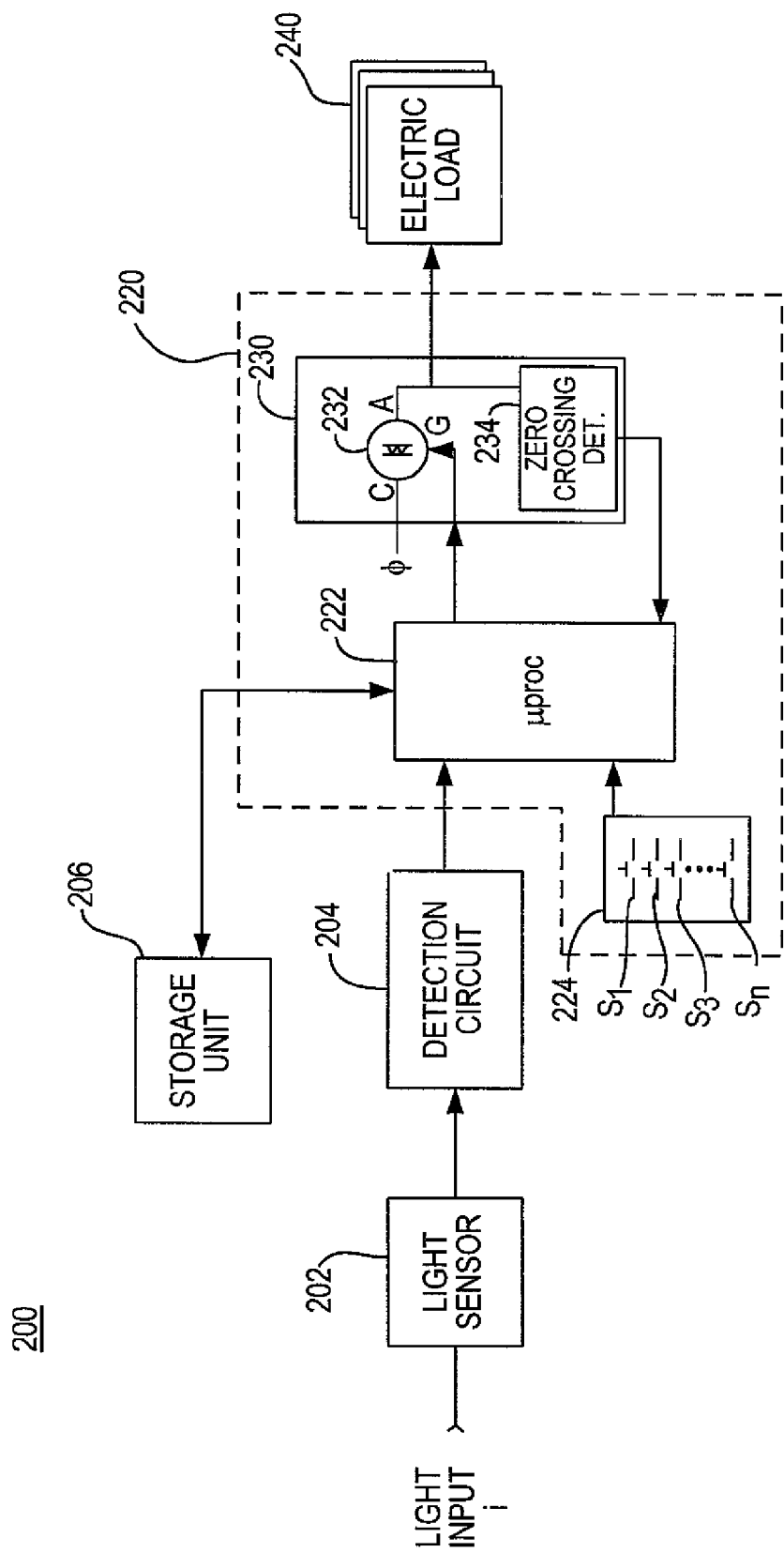
FIG. 2 shows a block diagram of the daylight harvesting light control system having auto-calibration in accordance with the present invention.

FIGS. 1 and 2 show a method and apparatus for enabling a daylight harvesting control device to automatically calibrate the light sensor within the light control system by setting the target voltage level required to maintain an acceptable minimum level of light in the interior space that is being illuminated.

Referring to FIG. 1, in step 102 all loads are forced to full illumination. Next, in step 104, all control devices inputs to the plurality of electrical loads are disabled during a defined period of time for auto-calibration. In one embodiment, this time period may be set to a 24 hour period to enable the light control system to monitor the ambient light level at all times of the day. Step 106 employs monitoring of the light sensor. The light level is detected in step 108. In step 110, the sensed light level is compared with a previously stored light level. In step 112, it is determined which light level is the lower. A target voltage is generated for the lower light level in step 114. Finally, in step 116 the lower light level and the target voltage level are stored.

The automated calibration method in accordance with the present invention takes advantage of the fact that the amount of light that the installed plurality of electrical loads provide at full brightness, where no external light is present such as that which comes from the sun through the windows, is typically the desired design level. The minimum brightness of the electrical loads is used as a comparison for the amount of light needed at full brightness. This typically occurs at night after work crews have left a given site where the light control system is installed.

Referring to FIG. 2, the light control system 200 in accordance with the present invention includes an ambient light sensor 202 connected to a detection circuit 204 for detecting the amount of ambient light within a given zone. A microprocessor 222, within a control device 220, connects between the detection circuit 204 and a dimming circuit 230 for providing control to initiate dimming. The dimming circuit 230 connects to a plurality of electrical loads 240 to control the power supplied to the plurality of electrical loads based on the amount of ambient light detected. Further, the control device 220 may include a set of user-actuated switches 224 ($S_1$, $S_2$, $S_3$ ... $S_n$) for user control that overrides the daylight harvesting feature.

In operation, the ambient light sensor 202 generates a first signal in response to being exposed to radiation. Detection circuit 204 generates a second signal from the first signal. Storage unit 206 is coupled to microprocessor 222 and is used to store light levels and to retrieve light levels. Microprocessor 222 receives the second signal from detection circuit 204—and compares it to a stored light level—to control the plurality of electrical loads. Dimming circuitry 230 connects between the microprocessor 222 and the electrical loads for increasing and decreasing the illumination of the electrical loads based on the control signals generated by microprocessor 222.

Microprocessor 222 includes the auto-calibration subroutine. During the method of automated calibration in accordance with the present invention, the microprocessor 222 monitors the light level sensed by light sensor 202 for the defined period of time. During initiation of the automated calibration process, microprocessor 222 generates a third signal and sends the third signal to the dimming circuitry 230 to force the plurality of electrical loads 240 to full illumination. Afterwards, the microprocessor 222 disables control of the plurality of electrical loads and sets a target signal level equal to the second signal at the beginning of the defined period of time; that is the initial target level is set to the illumination level detected prior to setting all the loads to full illumination. The storage unit 206 stores the target signal level. Continuously, microprocessor 222 monitors the detected light level from the detection circuit for the defined period of time and compares a current light level (obtained from the second signal) with the previous detected light level. Microprocessor determines which of the two levels is a lower level. This is done continuously until the defined time period lapses at which point a lowest level will have been found for the defined period based on the above procedure. At this point, microprocessor 222 generates a new target level based on the selected lowest level. The selected lowest level and the new target level are then stored in the storage unit 206.

In an embodiment of the light control system in accordance with the present invention, dimming circuit 230 may include a triac 232 coupled to a zero crossing detector 234 to employ phase regulation, in which the power circuit is switched ON at a time delay following a zero-crossing of the AC sine wave input until the end of each half cycle, in an effort to supply a variable level of power to the plurality of electrical loads. The electrical loads may also include a fluorescent lamp with a ballast, with the dimming circuit configured to provide a variable low voltage (0-10 V) output to the ballast.

The light control system in accordance with the present invention may further include apparatus for initiating the auto-calibration function, such as a DIP switch (not shown).

Advantages of this design include but are not limited to a closed loop daylight harvesting photocell target auto calibration method having a high performance, simple, and cost effective process.

Those of skill in the art will recognize that the physical location of the elements presented in FIG. 2 can be moved or relocated while retaining the function described above.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A method of auto-calibration for setting the target voltage level of a light sensor included within a daylight harvesting controller, comprising the steps of:
    a. forcing all attached electrical loads to full illumination for a defined period of time;
    b. disabling all control device inputs to each electrical load during the defined time period;
    c. monitoring the light sensor during the defined time period;
    d. detecting the light level sensed by the light sensor;
    e. comparing each detected light level with a previously stored light level;
    f. determining which light level is the lowest light level;
    g. generating a target voltage level based upon the lowest light level;
    h. storing the lowest light level and the target voltage level; and
    i. repeating steps c through h.

2. The method as recited in claim 1, wherein the defined period of time is 24 hours.

3. A light control system for controlling the brightness of a plurality of electrical loads, comprising:
    an ambient light sensor that outputs a first signal in response to being exposed to radiation for sensing the ambient light level;
    a detection circuit coupled to the light sensor to generate a second signal from the first signal;
    a storage unit coupled to receive the second signal;
    a microprocessor, having an auto-calibration subroutine, the microprocessor coupled to receive the second signal from the detection circuit to control the plurality of electrical loads; and
    a dimming circuitry unit coupled between the microprocessor and the plurality of electrical loads for increasing and decreasing the illumination of the plurality of electrical loads;
    wherein, during the activation of the auto-calibration subroutine for a predetermined period of time, the microprocessor generates a third signal and sends the third signal to the dimming circuitry to force the plurality of electrical loads to full illumination and disables control of the plurality of electrical loads, the microprocessor sets a target signal level equal to the second signal at the beginning of the predetermined period of time and stores the target signal level in the storage unit, the microprocessor monitors the second signal for the predetermined period of time and compares the second signal with the stored target signal level to determine which is a lower signal, the microprocessor sets the target signal level to equal the lower signal and stores the target signal level in the storage unit.

4. The light control system as recited in claim 3, wherein the dimming circuitry comprises: a triode alternating current switch (triac); and a zero crossing detector coupled to the triac to employ phase regulation.

5. The light control system as recited in claim 3, further comprising: a dip switch coupled to the microprocessor to activate the auto-calibration subroutine.

6. The light control system as recited in claim 3, wherein the dimming circuitry is configured to provide an output in the range 0-10 V.

7. The light control system as recited in claim 3, wherein the electrical loads comprise a fluorescent light source.

8. The light control system as recited in claim 7, wherein the electrical loads further comprise a ballast.

9. The light control system as recited in claim 8, wherein the dimming circuitry is configured to provide an output in the range 0-10 V for controlling the ballast.

10. A method of determining a target light level for a light harvesting operation, the method comprising:
    forcing a lighting load in a space to a defined level during an auto-calibration period;
    monitoring the light level in the space during the auto-calibration period;
    determining the target light level by comparing a light level monitored during the auto-calibration period to other light levels monitored during the auto-calibration period; and
    saving the target light level for a light harvesting operation in the space.

11. The method of claim 10 wherein the defined level comprises a design level.

12. The method of claim 10 wherein the defined level comprises a maximum level.

13. The method of claim 10 wherein the target light level comprises the minimum light level monitored during the auto-calibration period.

14. The method of claim 10 wherein the auto-calibration period includes a time at which the external light entering the space is a minimum.

15. The method of claim 10 wherein:
    forcing a lighting load in a space to a defined level during an auto-calibration period comprises activating at least one lighting fixture to illuminate an area at a highest level achievable by the at least one lighting fixture;
    monitoring the light level in the space during the auto-calibration period comprises monitoring an illumination level of the area over a predetermined period of time;
    determining the target light level comprises determining a lowest illumination level occurring during the predetermined period of time; and
    the target illumination level comprises the lowest illumination level.

16. The method of claim 15 wherein the predetermined period of time is twenty-four (24) hours.

17. The method of claim 15 wherein:
    monitoring an illumination level of the area over a predetermined period of time comprises periodically sampling the illumination level; and
    saving the target light level for a light harvesting operation in the space comprises storing the lowest illumination level detected at a sample.

18. The method of claim 15 wherein:
    monitoring an illumination level of the area over a predetermined period of time comprises continuously measuring the illumination level; and saving the target light level for a light harvesting operation in the space comprises storing the lowest illumination level detected.

19. The method of claim 15, further comprising:

disabling a dimming control to prevent alteration of the lighting level supplied by the at least one lighting fixture during the predetermined period of time.

20. The method of claim 15 wherein the method is performed automatically.

21. The method of claim 10 wherein the method is performed automatically.

* * * * *

UNITED STATES PATENT AND TRADEMARK OFFICE
CERTIFICATE OF CORRECTION

| | | |
|---|---|---|
| PATENT NO. | : 7,608,807 B2 | Page 1 of 1 |
| APPLICATION NO. | : 11/381984 | |
| DATED | : October 27, 2009 | |
| INVENTOR(S) | : Robert L. Hick et al. | |

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 92 days.

should read (*) Notice: Subject to any disclaimer, the term of this patent is extended or adjusted under 35 U.S.C. 154(b) by 113 days.

Signed and Sealed this

Fourth Day of May, 2010

David J. Kappos
*Director of the United States Patent and Trademark Office*